(12) United States Patent
Nakatomi et al.

(10) Patent No.: US 10,801,243 B2
(45) Date of Patent: Oct. 13, 2020

(54) BACK DOOR STRUCTURE

(71) Applicant: TOYOTA JIDOSHA KABUSHIKI KAISHA, Toyota-shi, Aichi-ken (JP)

(72) Inventors: Noriaki Nakatomi, Miyoshi (JP); Satoshi Yamane, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 93 days.

(21) Appl. No.: 15/878,808

(22) Filed: Jan. 24, 2018

(65) Prior Publication Data

US 2018/0274278 A1 Sep. 27, 2018

(30) Foreign Application Priority Data

Mar. 24, 2017 (JP) .................................. 2017-059900

(51) Int. Cl.
| | |
|---|---|
| *E05F 1/12* | (2006.01) |
| *E05D 3/14* | (2006.01) |
| *E05F 1/10* | (2006.01) |
| *B60J 5/10* | (2006.01) |
| *E05F 5/02* | (2006.01) |

(52) U.S. Cl.
CPC ............ *E05F 1/1292* (2013.01); *E05D 3/145* (2013.01); *E05D 3/147* (2013.01); *E05F 1/105* (2013.01); *E05F 1/1253* (2013.01); *B60J 5/101* (2013.01); *E05F 5/02* (2013.01); *E05Y 2201/21* (2013.01); *E05Y 2201/264* (2013.01); *E05Y 2201/474* (2013.01); *E05Y 2201/492* (2013.01); *E05Y 2201/68* (2013.01); *E05Y 2600/10* (2013.01); *E05Y 2600/12* (2013.01); *E05Y 2600/626* (2013.01); *E05Y 2900/546* (2013.01)

(58) Field of Classification Search
CPC .......... E05D 3/145; E05D 3/147; B60J 5/101; E05F 1/1246; E05F 1/1269; E05F 1/1276; E05F 1/1292
See application file for complete search history.

(56) References Cited

U.S. PATENT DOCUMENTS

| | | | | |
|---|---|---|---|---|
| 2,154,733 | A * | 4/1939 | De Orlow | ............... E05D 3/145 16/287 |
| 4,223,420 | A * | 9/1980 | Yukimoto | ............... E05D 3/145 16/288 |
| 6,736,440 | B1 * | 5/2004 | Hashim | .................. E05D 3/145 296/146.11 |

(Continued)

FOREIGN PATENT DOCUMENTS

| | | |
|---|---|---|
| JP | H09-220934 A | 8/1997 |
| JP | 2007-245746 A | 9/2007 |

*Primary Examiner* — Gregory J Strimbu
(74) *Attorney, Agent, or Firm* — Oliff PLC (57) ABSTRACT

A back door structure includes a first arm, a second arm, a damper stay, and a supporting member. The first arm is fixed to an upper section of a vehicle body rear section, and is fixed to an upper section of a back door. The second arm is fixed to the upper section of the vehicle body rear section, and is fixed to the upper section of the back door. The damper stay is fixed to the back door, is fixed to the vehicle body rear section, and biases the back door in an opening direction. The supporting member is fixed to the second arm, is fixed to the back door, and biases the second arm substantially toward a vehicle upper side in a fully closed state of the back door.

5 Claims, 10 Drawing Sheets

(56) References Cited

U.S. PATENT DOCUMENTS

| | | | | |
|---|---|---|---|---|
| 7,552,789 | B2* | 6/2009 | Gust | B60R 21/38 |
| | | | | 180/69.21 |
| 2003/0217436 | A1* | 11/2003 | Hashim | E05D 3/145 |
| | | | | 16/286 |
| 2004/0205934 | A1* | 10/2004 | Derbis | E05D 3/145 |
| | | | | 16/289 |
| 2004/0256882 | A1* | 12/2004 | McRobert | B60J 5/0472 |
| | | | | 296/146.11 |
| 2007/0080010 | A1* | 4/2007 | Gust | B60R 21/38 |
| | | | | 180/69.2 |
| 2007/0096502 | A1* | 5/2007 | Hakamata | B60J 5/101 |
| | | | | 296/146.8 |
| 2009/0309971 | A1* | 12/2009 | Schuetz | B60R 11/04 |
| | | | | 348/148 |
| 2018/0201106 | A1* | 7/2018 | Facchinello | B60J 7/196 |

* cited by examiner

BACK DOOR STRUCTURE

CROSS-REFERENCE TO RELATED APPLICATION

This application claims priority under 35 USC 119 from Japanese Patent Application No. 2017-059900 filed Mar. 24, 2017, the disclosure of which is incorporated by reference herein.

BACKGROUND

Technical Field

The present invention relates to a back door structure.

Related Art

Japanese Patent Application Laid-Open (JP-A) No. H09-220934 describes an opening/closing device for a back door of a vehicle. The vehicle back door opening and closing device includes a link member having one end swingably fixed to an upper end of a rear opening of a vehicle body, and having another end swingably fixed to an upper end of a vehicle back door (referred to hereafter as a "back door"). The link member enables the center of swing to shift toward the vehicle front as the back door opens, thereby enabling a projection amount of the door toward the vehicle rear when opening the back door to be made smaller.

A damper stay spans between the back door and the periphery of the rear opening of the vehicle body. The damper stay is biased so as to elongate along its length direction, thereby biasing the back door in an opening direction. This reduces operation force to open the back door. However, in the back door opening/closing device described in JP-A No. H09-220934, the center of swing of the back door shifts toward the vehicle front as the back door opens. Namely, the direction of the biasing force required to reduce the operation force to open the back door changes depending on the degree of opening of the back door. There is accordingly a possibility that biasing force from the damper stay alone may not be able to reduce the operation force to open the back door. The related art therefore leaves room for improvement in this respect.

SUMMARY

In consideration of the above circumstances, the present invention provides a back door structure capable of reducing operation force in a back door that has a small projection amount from a vehicle when opened.

A back door structure of a first aspect of the present invention includes a first arm, a second arm, a damper stay, and a supporting member. The first arm has one end portion swingably fixed to a first joint provided at an upper section of a vehicle body rear section, and has another end portion swingably fixed to a second joint provided at an upper section of a back door. The second arm has one end portion swingably fixed to a third joint provided at the upper section of the vehicle body rear section at a vehicle lower side of the first joint, and has another end portion swingably fixed to a fourth joint provided at the upper section of the back door at a vehicle lower side of the second joint. The damper stay has one end portion swingably fixed to the back door, has another end portion swingably fixed to the vehicle body, and biases the back door in an opening direction. The supporting member has one end portion swingably fixed to the second arm, has another end portion swingably fixed to the back door, and biases the other end portion of the second arm substantially toward a vehicle upper side in a fully closed state of the back door.

According to the first aspect, the upper section of the vehicle body and the upper section of the back door are coupled together by the first arm and the second arm. The one end portion of the first arm is swingably fixed to the first joint provided at the upper section of the vehicle body, and the other end portion of the first arm is swingably fixed to the second joint provided at the upper section of the back door. The one end portion of the second arm is swingably fixed to the third joint provided at the upper section of the vehicle body rear section at the vehicle lower side of the first joint, and the other end portion of the second arm is swingably fixed to the fourth joint provided at the upper section of the back door at the vehicle lower side of the second joint. Accordingly, the first arm and the second arm act as a four-bar linkage, so to speak, such that the back door swings about an imaginary point (instant center of rotation) due to restriction by this linkage. Moreover, the back door and the vehicle body are coupled together by the damper stay, of which the one end is swingably fixed to the back door and the other end is swingably fixed to the vehicle body. The damper stay biases the back door in the opening direction. The operation force to open the back door is thus reduced, making the back door easier to open.

Note that since the first arm and the second arm act as a four-bar linkage, when opening the back door, the instant center of rotation shifts toward the vehicle front due to the action being restricted by the linkage. Accordingly, when the back door is opened, the back door moves toward the vehicle front, enabling a projection amount of the back door to the vehicle rear of the vehicle to be made smaller. However, the direction of the biasing force required in order to reduce the operation force to open the back door varies depending on the degree of opening of the back door. It is thus possible that the biasing force of the damper stay alone may not be able to reduce the operation force to open the back door. Thus, the supporting member is provided between the second arm and the back door. The one end portion of the supporting member is swingably engaged with the second arm, the another end portion of the supporting member is swingably fixed to the back door, and the supporting member biases the other end portion of the second arm that is fixed to the back door substantially toward the vehicle upper side. An opening action of the back door is thus supported not only by the biasing force of the damper stay, but also by the biasing force of the supporting member, thereby enabling the operation force to be reduced.

A back door structure of a second aspect of the present invention is the first aspect, wherein the second arm includes a projection in a vicinity of the other end portion of the second arm, the projection projecting out substantially toward the vehicle front in the fully closed state of the back door. Moreover, in the second aspect, the one end portion of the supporting member is swingably fixed to the projection.

According to the second aspect, in the vicinity of the other end portion of the second arm, the second arm is provided with the projection that projects out substantially toward the vehicle front in the fully closed state of the back door. The one end portion of the supporting member is swingably engaged with the projection. The biasing force of the supporting member biasing the other end portion of the second arm substantially toward the vehicle upper side is thus magnified according to the principle of leverage, thereby causing a larger rotation moment to act on the second arm so as to cause the back door to swing substantially toward the vehicle upper side about the one end portion of the second arm. This thereby enables the operation force to open the back door to be further reduced.

A back door structure of a third aspect of the present invention is either the first aspect or the second aspect, wherein the supporting member is disposed such that in a vehicle side view a length direction of the supporting member is substantially parallel to a length direction of the damper stay in the fully closed state of the back door.

According to the third aspect, the length direction of the supporting member is disposed so as to be substantially parallel to the length direction of the damper stay in a vehicle side view when the back door is fully closed. This thereby enables the supporting member and the damper stay to be suppressed from getting in each other's way when opening and closing the back door. This thereby enables interference between members to be prevented when opening and closing the back door.

Here, "substantially parallel" includes cases in which the distance between the one end portion of the damper stay (back door side) and the other end portion of the supporting member (back door side) differs from the distance between the other end portion of the back door (vehicle body side) and the one end portion of the supporting member (second arm side) (referred to as resembling sides of a trapezoidal shape).

A back door structure of a fourth aspect of the present invention is of any one of the first aspect to the third aspect, wherein an operation recess opening toward a vehicle rear is formed at a rear end section of the back door when the back door is fully open, and a vehicle lower side portion of the operation recess is configured by an inclined wall sloping toward a vehicle lower side on progression toward a vehicle front.

According to the fourth aspect, the operation recess opening toward the vehicle rear is formed at the rear end section of the back door when the back door is fully open, such that an operator is able to hold onto the operation recess with their hand and close the back door. Moreover, the vehicle lower side portion of the operation recess is configured by the inclined wall sloping toward the vehicle lower side on progression toward the vehicle front, enabling the hand to be suppressed from slipping off of the inclined wall when the operator applies operation force toward the vehicle lower side to the inclined wall in order to close the back door. This thereby enables ease of operation to be improved.

BRIEF DESCRIPTION OF THE DRAWINGS

Exemplary Embodiments of the present invention will be described in detail based on the following figures, wherein.

DETAILED DESCRIPTION

Explanation follows regarding an exemplary embodiment of the present invention, with reference to FIG. 1 to FIG. 10. Note that in the drawings, the arrow FR indicates the front in a vehicle front-rear direction, the arrow OUT indicates outward in a vehicle width direction, and the arrow UP indicates upward in a vehicle vertical direction.

Figure 1:
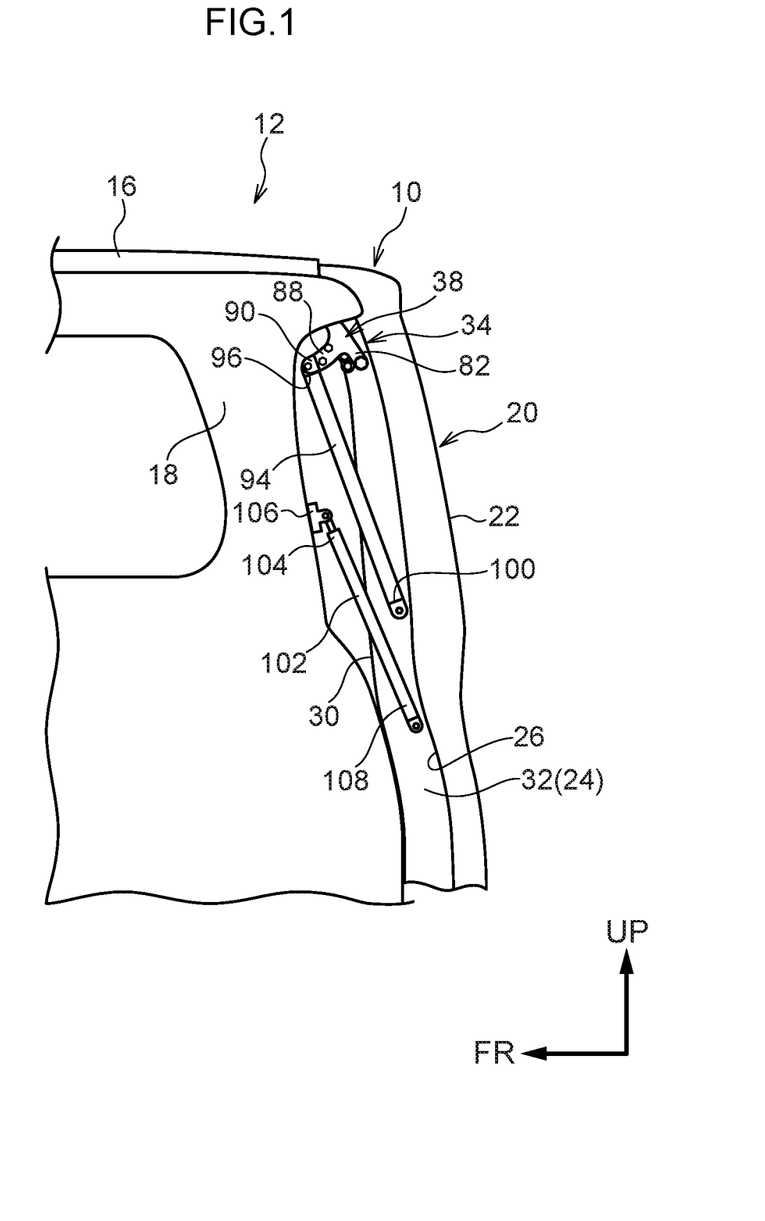
FIG. 1 is a side view illustrating part of a vehicle body rear section when a back door having a back door structure according to an exemplary embodiment is fully closed.
Figure 7:
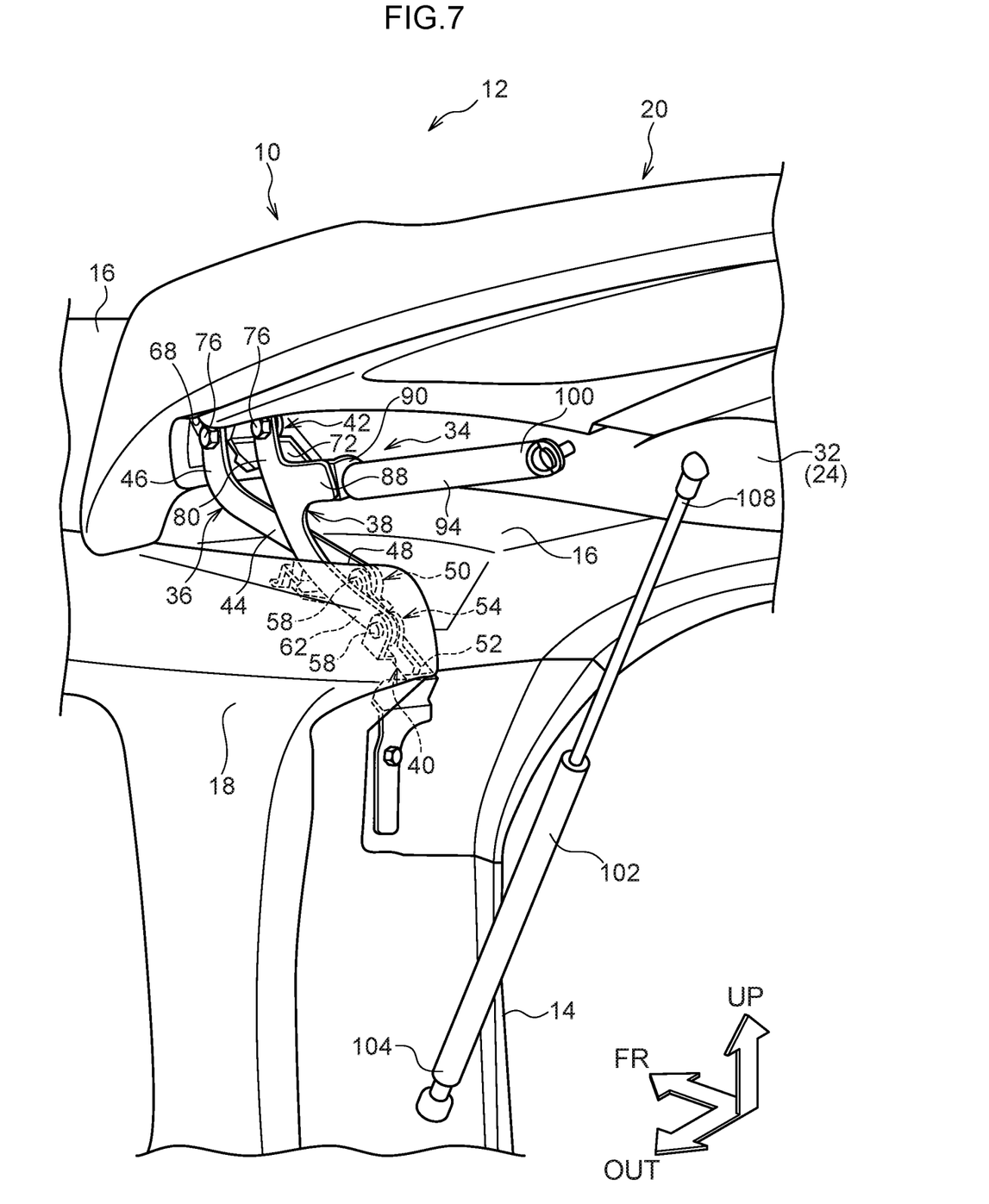
FIG. 7 is a schematic perspective view illustrating part of a vehicle body rear section when a back door having a back door structure according to an exemplary embodiment is fully open.

As illustrated in FIG. 1, a vehicle body rear section of a vehicle 12 applied with a back door structure 10 according to the present exemplary embodiment includes a back door opening 14 that has a substantially rectangular shape when viewing a back face of the vehicle (see FIG. 7). The vehicle body rear section of the vehicle 12 is provided with a roof panel 16 extending along the vehicle front-rear direction at a vehicle upper section, and side member outer panels 18 that each extend along the vehicle front-rear direction and along the vehicle vertical direction at both vehicle width direction ends.

The back door opening 14 is opened up and closed off by a back door 20. The back door 20 includes a door outer panel 22, serving as a door outer, disposed on the outer side of the door (vehicle outer side), and a door inner panel 24, serving as a door inner, disposed on the inner side of the door (vehicle inner side). An edge portion 26 of the door inner panel 24 (see FIG. 2) is joined to a peripheral edge portion 28 of the door outer panel 22 (see FIG. 2), thereby integrating the door outer panel 22 and the door inner panel 24 together, and thus forming the back door 20 with a closed cross-section structure.

The door inner panel 24 is formed with an offset face 30 that is offset toward the vehicle front with respect to the edge portion 26. An inner panel side-wall 32 coupling the offset face 30 and the edge portion 26 together in substantially the vehicle front-rear direction is formed around substantially the entire periphery of the door inner panel 24.

Figure 8A:
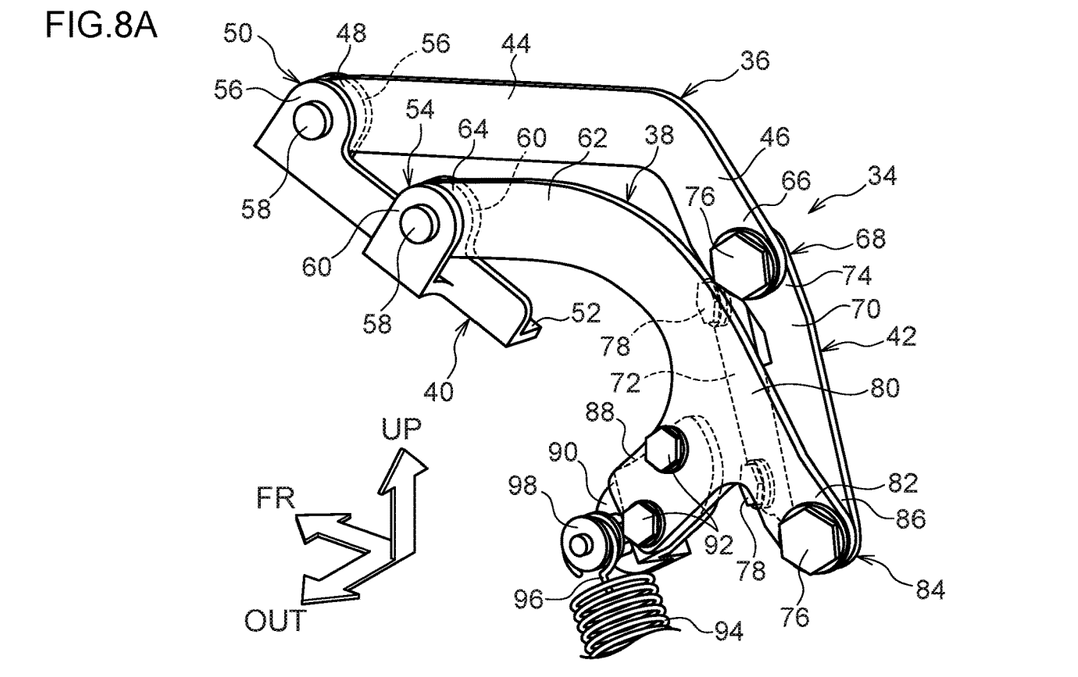
FIG. 8A is a perspective view illustrating a hinge section in a back door structure according to an exemplary embodiment in a state viewed from the rear of a vehicle toward the front of the vehicle.

An upper section of the back door 20 and an upper section of the vehicle body rear section are swingably coupled together by hinge sections 34. As illustrated in FIG. 8A, each hinge section 34 includes a first arm 36, a second arm 38, a vehicle body attachment bracket 40, and a back door attachment bracket 42. The first arm 36 is formed in an elongated, substantially plate shape, and is formed with a substantially L-shaped profile in a vehicle side view, configured by a first arm front portion 44 extending along the vehicle front-rear direction and a first arm rear portion 46 sloping toward the vehicle lower side on progression toward the vehicle rear from a rear end of the first arm front portion 44.

A front end 48 of the first arm front portion 44, serving as one end portion in the length direction of the first arm 36, is swingably fixed to a first joint 50 of the vehicle body attachment bracket 40 that is attached to the upper section of the vehicle body rear section. The vehicle body attachment bracket 40 includes a bracket base end 52 (see FIG. 7) attached to a join location between the roof panel 16 and the corresponding side member outer panel 18, and also includes the first joint 50 and a third joint 54 projecting out from the bracket base end 52 toward the vehicle upper side. The bracket base end 52 is formed in a substantially rectangular plate shape with its plate thickness direction in substantially the vehicle vertical direction and with its length direction running in the vehicle front-rear direction. The bracket base end 52 is fixed to the vehicle body so as to slope toward the vehicle lower side on progression toward the vehicle rear.

The first joint 50 is disposed at a vehicle front end and vehicle width direction outer side of the bracket base end 52, and includes a pair of first joint side-walls 56 that face each other along the vehicle width direction. The pair of first joint side-walls 56 are each formed with a through hole, not illustrated in the drawings, penetrating in the plate thickness direction. A shaft member 58 is inserted through the through holes in the first joint side-walls 56, and also through a through hole, not illustrated in the drawings, in the front end 48 of the first arm front portion 44, which is inserted between the pair of first joint side-walls 56. The shaft member 58 is formed in a circular column shape with its axial direction running in the vehicle width direction, such that the first arm 36 is capable of swinging about the first joint 50.

The third joint 54 is disposed substantially at the vehicle front-rear direction center, and at the vehicle width direction outer side, of the bracket base end 52. The third joint 54 includes a pair of third joint side-walls 60 that face each other along the vehicle width direction. Namely, the third joint 54 is disposed at the vehicle lower side of the first joint 50. The pair of third joint side-walls 60 are each formed with a through hole, not illustrated in the drawings, penetrating in the plate thickness direction. A shaft member 58 running along the vehicle width direction is inserted through the through holes in the third joint side-walls 60, and also through a through hole, not illustrated in the drawings, in a front end 64 of a second arm front portion 62, described later, which is inserted between the pair of third joint side-walls 60.

A rear end 66 of the first arm rear portion 46, serving as another end portion in the length direction of the first arm 36, is swingably fixed to a second joint 68 of the back door attachment bracket 42 that is attached to the upper section of the back door 20. The back door attachment bracket 42 is configured including a back door bracket base end 70 that is formed with an elongated profile, and a back door bracket attachment section 72 projecting out from the back door bracket base end 70 toward the vehicle front. The back door bracket base end 70 is disposed with its length direction running along substantially the same line as the first arm rear portion 46. Moreover, an upper end 74 of the back door bracket base end 70 and the rear end 66 of the first arm rear portion 46 are swingably fixed together by a bolt 76 having an axial direction running in the vehicle width direction.

The back door bracket attachment section 72 is angled toward the vehicle width direction inner side so as to abut the inner panel side-wall 32 of the back door 20 (see FIG. 7), and is fastened to the inner panel side-wall 32 by plural bolts 78. The back door attachment bracket 42 is thereby fixed to the back door 20.

The second arm 38 is formed in an elongated, substantially plate shape similarly to the first arm 36, and, in a vehicle side view, is formed with a substantially L-shaped profile configured by the second arm front portion 62 extending substantially along the vehicle front-rear direction, and a second arm rear portion 80 that slopes toward the vehicle lower side on progression toward the vehicle rear from a rear end of the second arm front portion 62.

The front end 64 of the second arm front portion 62, serving as one end portion in the length direction of the second arm 38, is swingably fixed to the third joint 54 of the vehicle body attachment bracket 40 that is attached to the upper section of the vehicle body rear section as described above. A rear end 82 of the second arm rear portion 80, serving as another end portion in the length direction of the second arm 38, is swingably fixed to a fourth joint 84 of the back door attachment bracket 42. The fourth joint 84 is disposed at a lower end 86 of the back door bracket base end 70 of the back door attachment bracket 42. Namely, the fourth joint 84 is disposed at the vehicle lower side of the second joint 68. Moreover, the lower end 86 of the back door bracket base end 70 and the rear end 82 of the second arm rear portion 80 are swingably fixed together by a bolt 76 having an axial direction running in the vehicle width direction.

A projection 88 is formed in the vicinity of the rear end 82 of the second arm rear portion 80. The projection 88 projects out substantially toward the vehicle front (more specifically, sloping toward the vehicle lower side on progression toward the vehicle front). The projection 88 is fastened to an angle-adjustable bracket 90 by plural bolts 92. The angle-adjustable bracket 90 projects out substantially toward the vehicle front, beyond a leading end of the projection 88. The angle of the angle-adjustable bracket 90 is adjustable with respect to the projection 88.

As illustrated in FIG. 1, a support spring 94, serving as a supporting member, spans between the projection 88 and the back door 20. The support spring 94 is formed with an elongated profile, and an upper end 96 of the support spring 94, serving as one end portion in the length direction thereof, is swingably fixed to an anchor portion 98 (see FIG. 8B) attached to the angle-adjustable bracket 90 at the projection 88. Moreover, a lower end 100 of the support spring 94, serving as another end portion in the length direction thereof, is swingably fixed to the inner panel side-wall 32 of the back door 20. The support spring 94 is set such that a biasing force attempting to make the support spring 94 contract along its length direction acts in the support spring 94. The angle-adjustable bracket 90, and therefore the projection 88, are thus biased toward the vehicle lower side, the rear end 82 of the second arm 38 is biased substantially toward the vehicle upper side by this biasing force.

A damper stay 102 spanning between the vehicle body and the back door 20 is provided at the vehicle lower side of the support spring 94. The damper stay 102 is formed with an elongated profile, and an upper end 104 of the damper stay 102, serving as another end portion in the length direction thereof, is swingably fixed to the vicinity of the back door opening 14 of the vehicle body through a damper stay bracket 106.

A lower end 108 of the damper stay 102, serving as one end portion in the length direction thereof, is swingably fixed to the inner panel side-wall 32 of the back door 20. The damper stay 102 is filled with gas, for example, causing a biasing force attempting to elongate the damper stay 102 in its length direction to act in the damper stay 102. The damper stay 102 is thus biased in an opening direction of the back door 20.

The upper end 104 of the damper stay 102 is disposed at the vehicle lower side of the upper end 96 of the support spring 94, and the lower end 108 of the damper stay 102 is disposed at the vehicle lower side of the lower end 100 of the support spring 94. Accordingly, the damper stay 102 and the support spring 94 are provided such that the length direction of the damper stay 102 and the length direction of the support spring 94 are substantially parallel to each other when the back door 20 is fully closed.

Figure 9A:
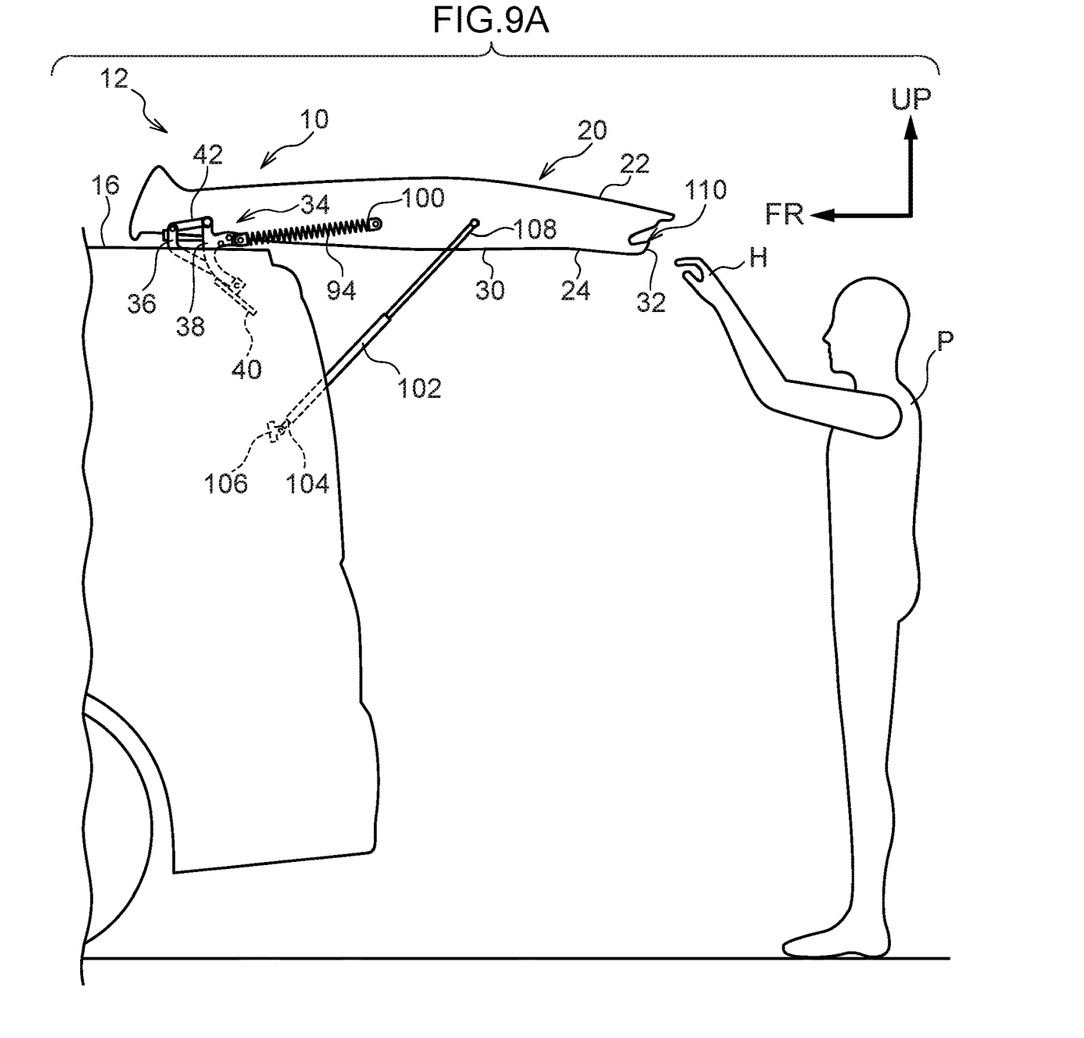
FIG. 9A is a side view illustrating a relationship with an operator of a back door having a back door structure according to an exemplary embodiment when the back door is open.
Figure 9B:
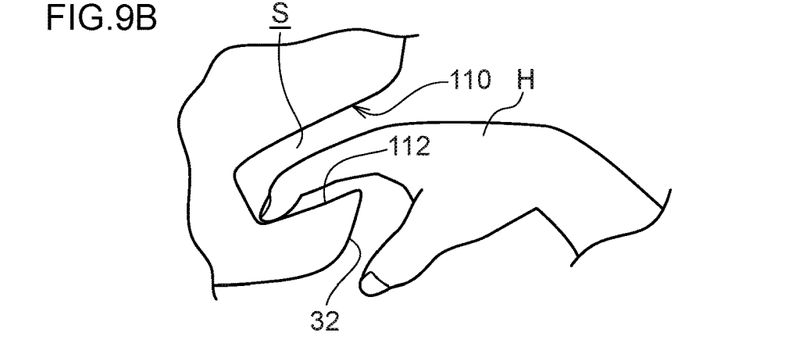
FIG. 9B is a schematic cross-section illustrating a state in which the hand of an operator has been inserted into a door pocket of the back door illustrated in FIG. 9A.

As illustrated in FIG. 9A, the rear end section of the back door 20 when the back door 20 is in a fully open state (the lower end of the back door 20 when the back door 20 is fully closed) is formed with a door pocket 110, serving as an operation recess. As illustrated in FIG. 9B, in the fully open state of the back door 20, the door pocket 110 is recessed substantially toward the vehicle front in the inner panel side-wall 32 of the back door 20, and is open toward the vehicle rear. Moreover, the door pocket 110 interior is provided with a space S into which an operator P (see FIG. 9A) is able to insert the fingers of their hand H. As illustrated in FIG. 9B, a vehicle lower portion of the door pocket 110 is configured by an inclined wall 112. The inclined wall 112 slopes toward the vehicle lower side on progression toward the vehicle front when the back door 20 is in the fully open state.

Hinge Section Operation

Figure 2:
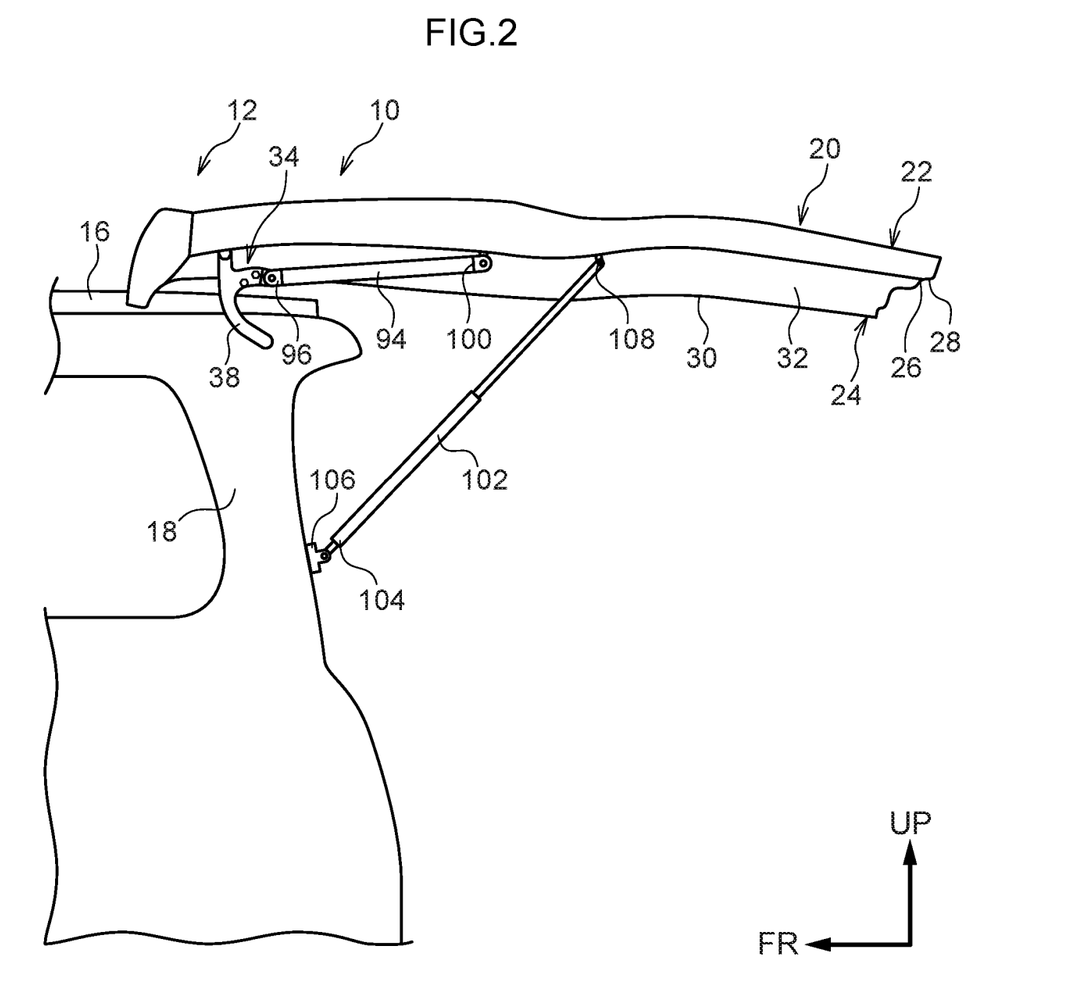
FIG. 2 is a side view illustrating a fully open state of the back door in FIG. 1.
Figure 3:
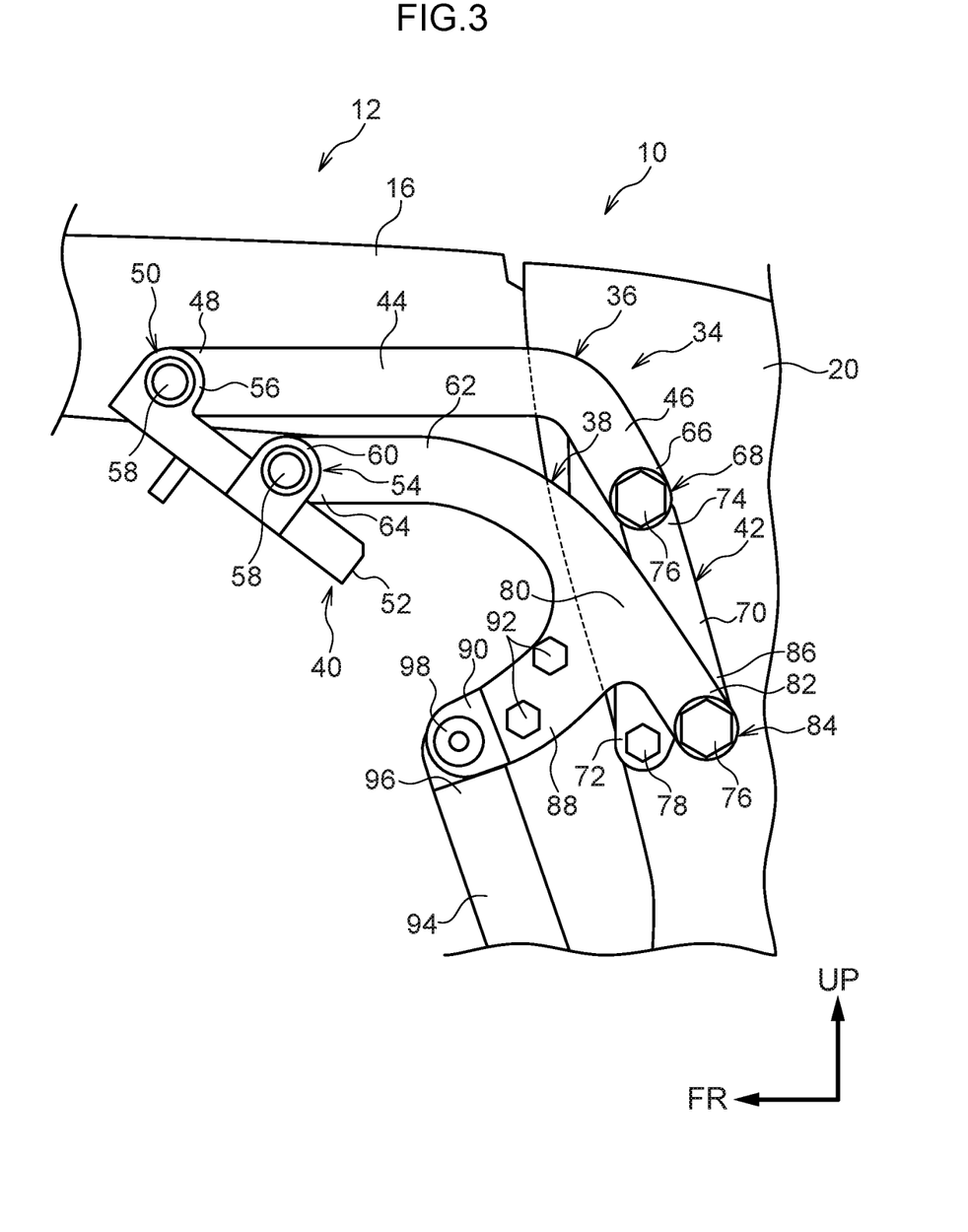
FIG. 3 is a side view illustrating a hinge section of a back door having a back door structure according to an exemplary embodiment when the back door is fully closed.
Figure 4:
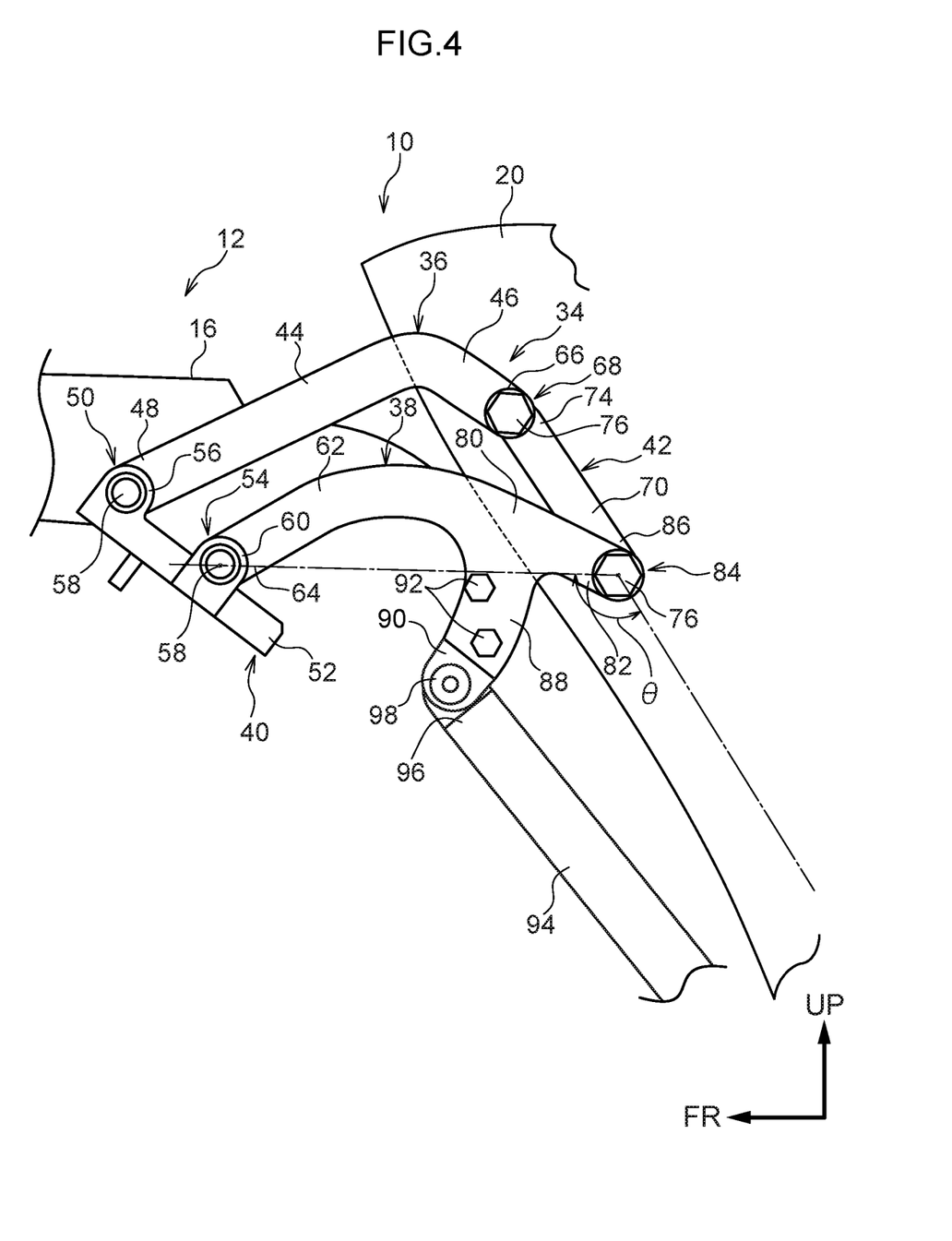
FIG. 4 is a side view corresponding to FIG. 3, illustrating an in-operation state of a hinge section in a back door structure according to an exemplary embodiment.
Figure 5:
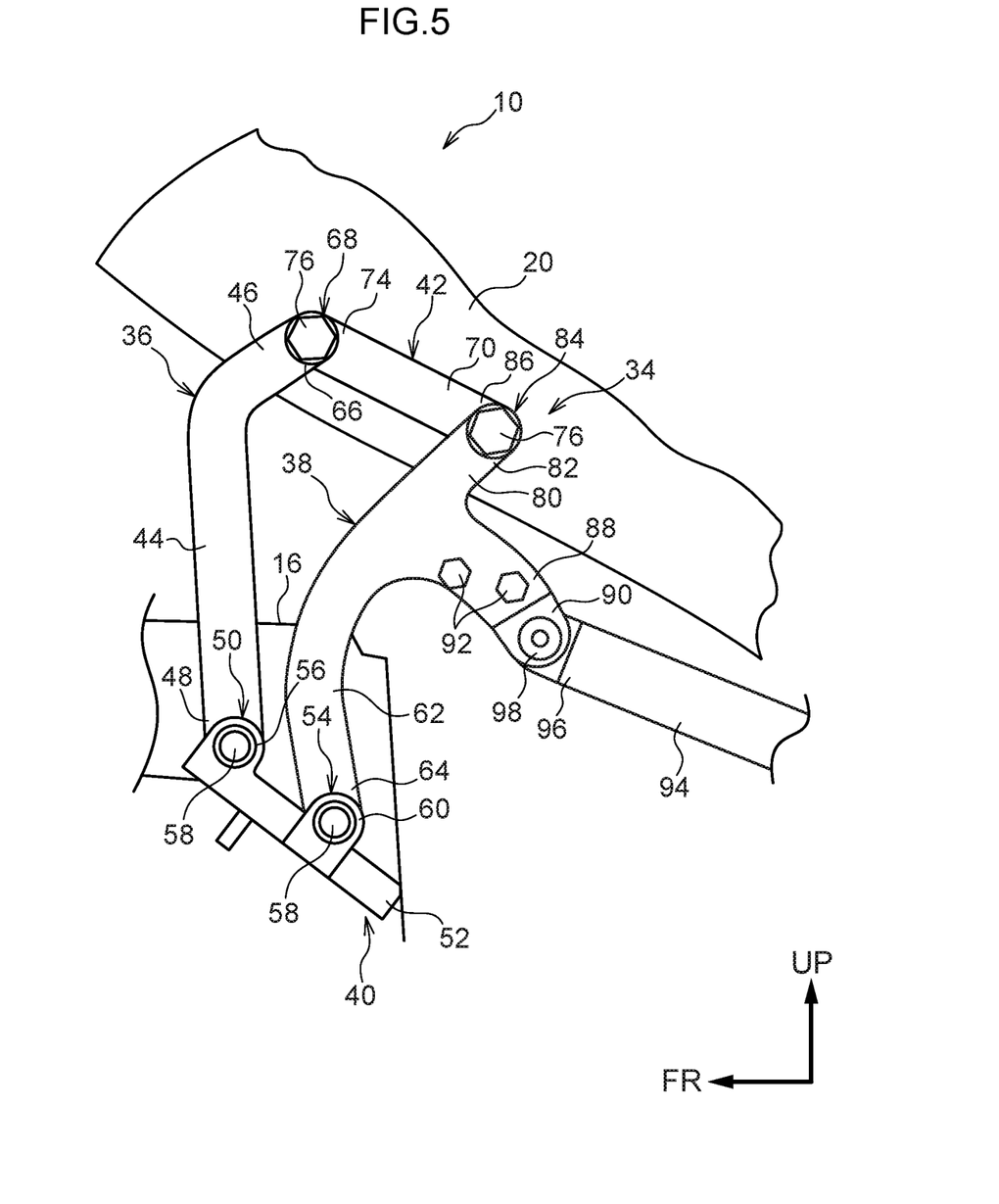
FIG. 5 is a side view corresponding to FIG. 3, illustrating an in-operation state of a hinge section in a back door structure according to an exemplary embodiment.
Figure 6:
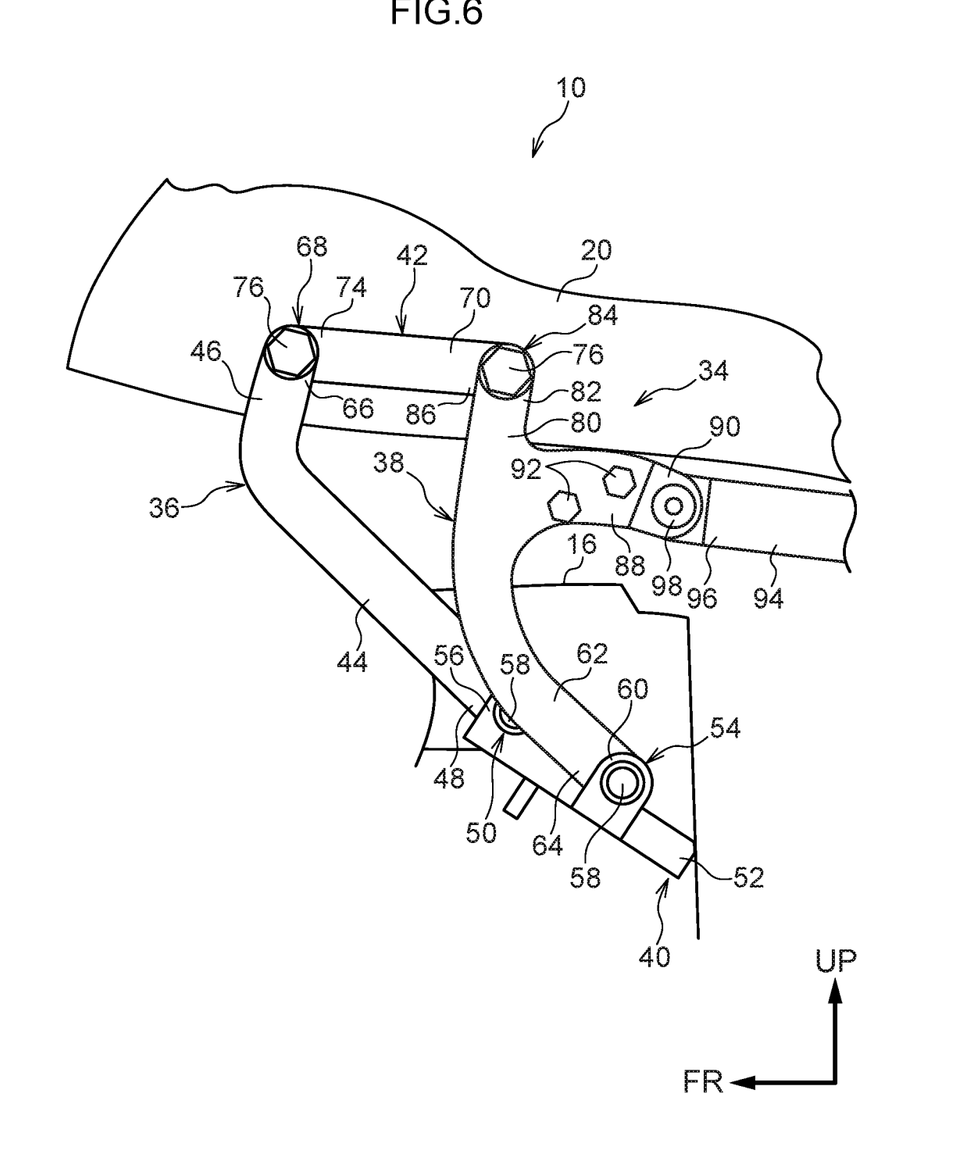
FIG. 6 is a side view corresponding to FIG. 3, illustrating an in-operation state of a hinge section in a back door structure according to an exemplary embodiment.

When a non-illustrated lock of the back door 20 is released and the back door 20 opens from a fully closed state, illustrated in FIG. 3, the first arm 36 of the hinge section 34 swings substantially toward the vehicle upper side about the first joint 50 as illustrated in FIG. 4. Moreover, at the same time as the first arm 36 swings, the second arm 38 swings toward the vehicle upper side about the third joint 54. When the degree of opening of the back door 20 increases, as illustrated in FIG. 5 and FIG. 6, the first arm 36 swings substantially toward the vehicle front about the first joint 50, and the second arm 38 swings toward the vehicle front about the third joint 54. Namely, when an opening operation is performed on the back door 20 in the fully closed state illustrated in FIG. 1, the instant center of rotation (not illustrated in the drawings) shifts toward the vehicle front as the back door 20 swings toward the vehicle upper side to adopt the fully open state illustrated in FIG. 2.

Operation and Advantageous Effects

Next, explanation follows regarding operation and advantageous effects of the present exemplary embodiment.

In the present exemplary embodiment, as illustrated in FIG. 1, the upper section of the vehicle body and the upper section of the back door 20 are coupled together by the hinge section 34 that supports the back door 20 so as to be openable and closable. As illustrated in FIG. 3, the hinge section 34 is configured including the first arm 36 and the second arm 38. The front end 48 of the first arm 36 is swingably fixed to the first joint 50 provided at the upper section of the vehicle body, and the rear end 66 of the first arm 36 is swingably fixed to the second joint 68 provided at the upper section of the back door 20. The front end 64 of the second arm 38 is swingably fixed to the third joint 54 provided at the vehicle lower side of the first joint 50 at the upper section of the vehicle body, and the rear end 82 of of the second arm 38 is swingably fixed to the fourth joint 84 provided at the vehicle lower side of the second joint 68 provided at the upper section of the back door 20. Accordingly, the first arm 36 and the second arm 38 act as a four-bar linkage, so to speak, such that the back door 20 swings about an imaginary point (instant center of rotation) due to restriction by this linkage. Moreover, as illustrated in FIG. 1 and FIG. 2, the damper stay 102 is provided between the back door 20 and the vehicle body. The lower end 108 of the damper stay 102 is swingably fixed to the back door 20, and the upper end 104 of the damper stay 102 is swingably fixed to the vehicle body, thus biasing the back door 20 in the opening direction. This makes the back door 20 easier to open.

Figure 10:
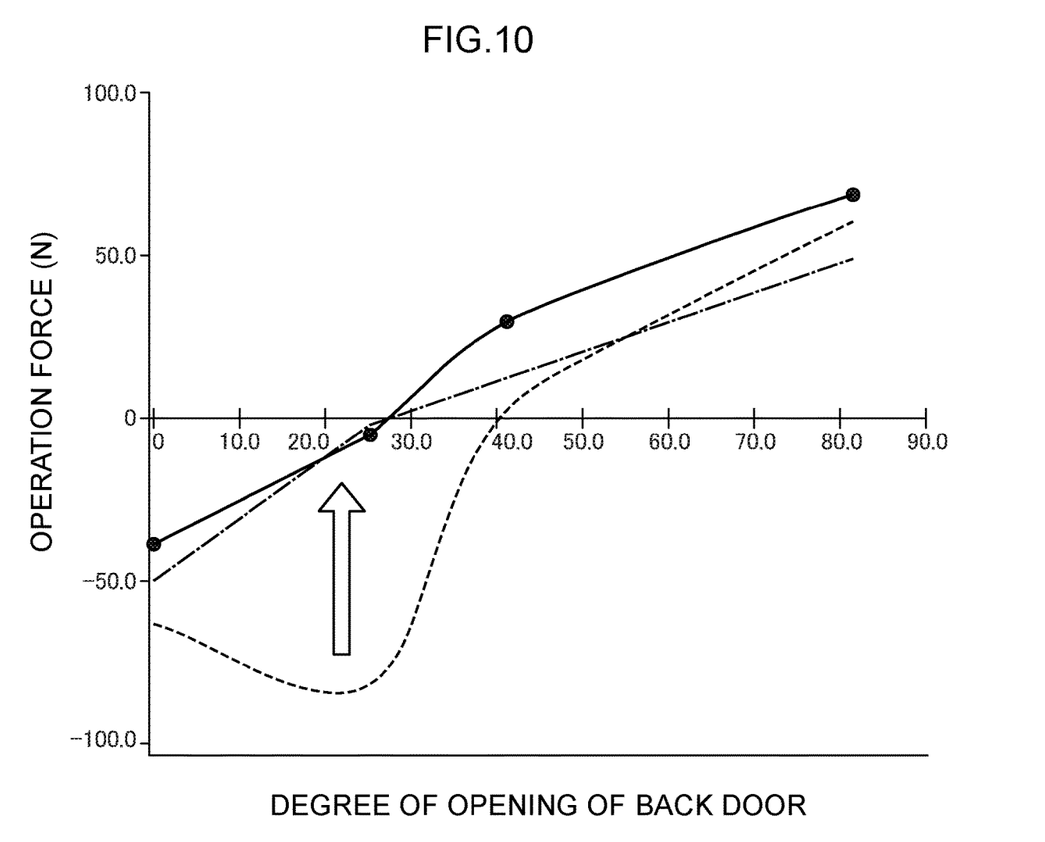
FIG. 10 is a graph illustrating a relationship between a degree of opening of a back door and operation force.

Note that since the first arm 36 and the second arm 38 configuring part of the hinge section 34 act as a four-bar linkage, when opening the back door 20, the instant center of rotation shifts toward the vehicle front due to the action being restricted by the linkage. Accordingly, when the back door 20 is opened, the back door moves toward the vehicle front, thereby enabling a projection amount of the back door 20 to the vehicle rear of the vehicle 12 to be made smaller. However, the direction of a biasing force required in order to reduce the operation force to open the back door 20 changes depending on the degree of opening of the back door 20. It is thus possible that the biasing force of the damper stay 102 alone may not be able to reduce the operation force to open the back door 20. Namely, in such cases, as illustrated by the dashed line in the graph of FIG. 10, a large negative operation force is required in the opening direction of the back door 20, particularly at an initial stage as the degree of opening of the back door 20 increases (when opening the back door 20). Therefore, the support spring 94 is provided between the second arm 38 and the back door 20, as illustrated in FIG. 1. The support spring 94 is formed with an elongated profile, with the upper end 96 swingably fixed to the second arm 38 and the lower end 100 swingably fixed to the back door 20. Moreover, the rear end 82 of the second arm 38 that is fixed to the back door 20 is biased substantially toward the vehicle upper side. Namely, the biasing force of the support spring 94 generates torque so as to rotate in a direction to reduce an angle θ (see FIG. 4) centered on the bolt 76 (rear end 82), thus lifting the back door 20 substantially toward the vehicle upper side such that the opening action of the back door 20 is supported by not only the biasing force of the damper stay 102 but also by the biasing force of the support spring 94, enabling the operation force to be reduced. When the operation force in this configuration is illustrated in the graph of FIG. 10, as illustrated by the dot-dash line in the graph, as the degree of opening of the back door 20 increases, the negative operation force in the opening direction of the back door 20 is no longer required due to the biasing force of the support spring 94, enabling a target operation force, illustrated by the solid line in the graph, to be approached. This thereby enables the operation force of the back door 20, which has a small projection amount from the vehicle 12 when open, to be reduced.

Figure 8B:
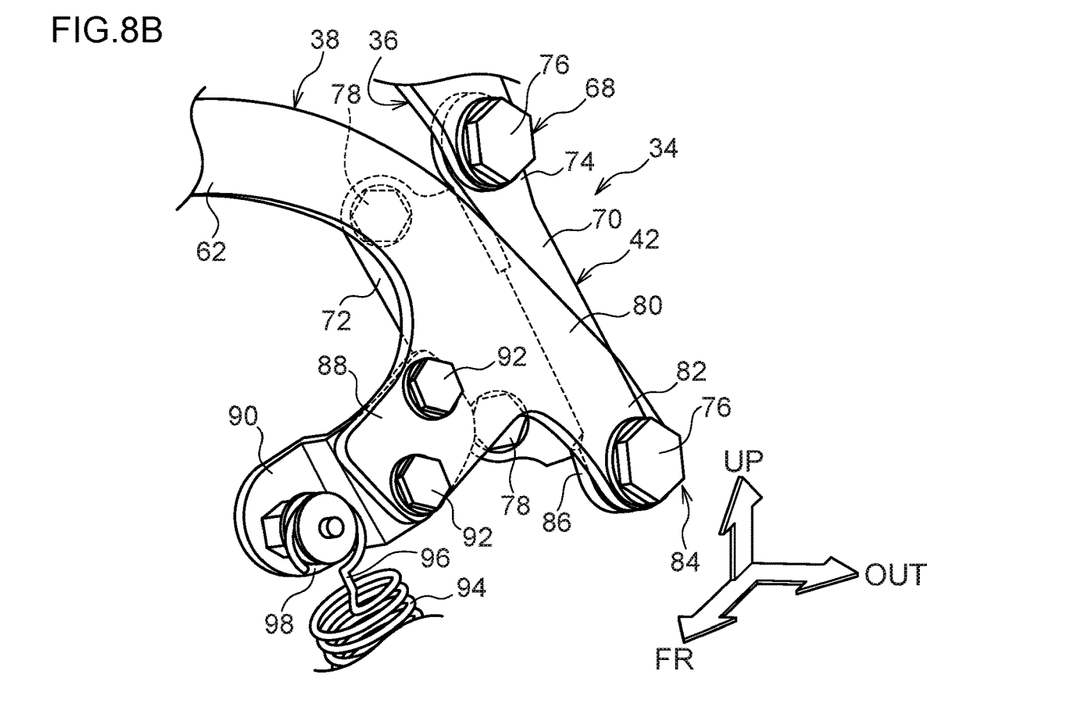
FIG. 8B is a perspective view illustrating the hinge section in FIG. 8A in a state viewed from the front of a vehicle toward the rear of the vehicle.

Moreover, as illustrated in FIG. 8A and FIG. 8B, in the vicinity of the rear end 82 of the second arm 38, the second arm 38 includes the projection 88 that projects out substantially toward the vehicle front when the back door 20 is in the fully closed state. The upper end 96 of the support spring 94 is swingably fixed to the angle-adjustable bracket 90, and thus to the projection 88. Accordingly, the biasing force of the support spring 94 biasing the rear end 82 of the second arm 38 substantially toward the vehicle upper side is magnified according to the principle of leverage, thereby causing a larger rotation moment to act on the second arm 38 so as to cause the back door 20 to swing substantially toward the vehicle upper side about the front end 64 of the second arm 38. This thereby enables the operation force to open the back door 20 to be further reduced. The operation force of the back door 20, which has a small projection amount from the vehicle 12 when opened, can accordingly be further reduced.

Moreover, as illustrated in FIG. 1, when the back door 20 is fully closed, the length direction of the support spring 94 is disposed substantially parallel to the length direction of the damper stay 102 in a vehicle side view. This thereby enables the support spring 94 and the damper stay 102 to be suppressed from getting in each other's way when opening and closing the back door 20. This thereby enables interference between members to be prevented when opening and closing the back door 20.

Moreover, as illustrated in FIG. 9A and FIG. 9B, the door pocket 110 opening toward the vehicle rear is formed in the rear end section of the back door 20 when the back door 20 is fully open, such that the operator P is able to hold onto the door pocket 110 with their hand H and close the back door 20. Moreover, the vehicle lower side of the door pocket 110 is configured by the inclined wall 112 that slopes toward the vehicle lower side on progression toward the vehicle front, enabling the hand H to be suppressed from slipping off of the inclined wall 112 when the operator P applies operation force toward the vehicle lower side to the inclined wall 112 in order to close the back door 20. This thereby enables ease of operation to be improved.

Moreover, as illustrated in FIG. 8A and FIG. 8B, the angle-adjustable bracket 90 is attached to the projection 88, and the upper end 96 of the support spring 94 is swingably fixed to the angle-adjustable bracket 90. The angle of the angle-adjustable bracket 90 with respect to the projection 88 is adjustable, thereby enabling the angle to be adjusted in order to adjust the biasing force of the support spring 94 and adjust the operation force as appropriate.

Note that in the exemplary embodiment described above, the damper stay 102 and the support spring 94 are disposed such that their respective length directions is substantially parallel when the back door 20 is fully closed. However, there is no limitation thereto, and the damper stay 102 and the support spring 94 may be disposed so as to form sides of a trapezoidal shape becoming more distant at either their respective upper ends or lower ends.

Further, the second arm 38 is configured including the projection 88; however, there is no limitation thereto. Configuration may be made in which the projection 88 is not provided and the upper end 96 of the support spring 94 is swingably fixed directly to the second arm 38. Moreover, configuration is made in which the angle-adjustable bracket 90 is attached to the projection 88; however, configuration may be made in which the angle-adjustable bracket 90 is not provided and the upper end 96 of the support spring 94 is swingably fixed to the projection 88.

Explanation has been given regarding an exemplary embodiment of the present invention. However, the present invention is not limited to the above, and obviously various other modifications may be implemented within a range not departing from the spirit of the present invention.

What is claimed is:

1. A back door structure for use with a back door of a vehicle, the back door structure comprising:
   a first arm that has one end portion swingably connected to a first joint disposed on an upper section of a rear section of a vehicle body of the vehicle, and that has another end portion swingably connected to a second joint disposed on an upper section of the back door;
   a second arm including:
      one end portion swingably connected to a third joint disposed on the upper section of the rear section of the vehicle body at a position lower than the first joint,
      another end portion swingably connected to a fourth joint disposed on the upper section of the back door at a position lower than the second joint when the back door is in a fully closed state, and
      a projection extending away from a centerline of the second arm which extends between the one end portion of the second arm and the another end portion of the second arm, the projection projecting substantially toward a front of the vehicle body when the back door is in the fully closed state, the projection being integrally formed together with the second arm in one piece as a unitary whole;
   a damper stay that has one end portion swingably connected to the back door, that has another end portion swingably connected to the vehicle body, and that biases the back door in an opening direction; and
   a supporting member that has one end portion swingably connected to the projection of the second arm, that has another end portion swingably connected to the back door, and that biases the another end portion of the second arm substantially toward a vehicle upper side when the back door is in the fully closed state.

2. The back door structure of claim 1, wherein the supporting member is configured such that, in a vehicle side view, a length direction of the supporting member is substantially parallel to a length direction of the damper stay when the back door is in the fully closed state.

3. The back door structure of claim 1, wherein
   an operation recess is disposed in a rear end section of the back door and is exposed when the back door is fully open, and
   the operation recess includes an inclined wall.

4. The back door structure of claim 1, wherein
   the first arm is elongated, and
   in a vehicle side view, the one end portion of the first arm extends in a vehicle front-rear direction when the back door is in the fully closed state, and is substantially L-shaped.

5. The back door structure of claim 1, wherein
   the second arm is elongated, and
   in a vehicle side view, the one end portion of the second arm extends in a vehicle front-rear direction when the back door is in the fully closed state, and is substantially L-shaped.

* * * * *